United States Patent [19]

Eglowstein et al.

[11] 4,390,967
[45] Jun. 28, 1983

[54] INTERFACE SYSTEM WHEREIN THE INTERFACE IS ADDRESSED BEFORE DATA TRANSFER FROM A SELECTED DEVICE

[75] Inventors: Ira Eglowstein; Peter E. Solender, both of Williamsville, N.Y.

[73] Assignee: Interface Systems, Inc., Williamsville, N.Y.

[21] Appl. No.: 196,661

[22] Filed: Oct. 14, 1980

[51] Int. Cl.³ .............................................. G06F 3/00
[52] U.S. Cl. ............................... 364/900; 340/825.21
[58] Field of Search ... 364/200 MS File, 900 MS File; 340/825.21, 825.52, 825.53; 370/85, 92

[56] References Cited

U.S. PATENT DOCUMENTS 3,778,772 12/1973 Rhodes ........................... 340/825.21
4,079,452 3/1978 Larson et al. .................... 364/900 X Primary Examiner—Raulfe B. Zache
Attorney, Agent, or Firm—Joseph P. Gastel; Martin LuKacher

[57] ABSTRACT

An interface system for expanding the number of device input ports and compatable with the message format and bus structure of a standard interface, namely the IEEE standard 488, has address decoding logic which identifies the expansion system and is operative to select, in accordance with an incoming message on the bus, which of several ports is to transmit or receive messages via the bus. Under control of the port identification message and strobe signals obtained from the handshake control logic of the expansion system, a sequence containing a predetermined number of bytes of port data is transmitted to the bus. The port data bytes may be coded in various formats, desirably BCD, which is compatable with the digital output format of many devices which may be interconnected and interfaced by the expansion system with the bus. Manual control is enabled by the control messages which are received by the expansion system, such that the transmission of messages to the bus from the selected port or from any device connected to the bus may, if desired, be inhibited until the manual control is activated. Different control messages may be used to enable the transmission of different message sequences with or without activation of the manual control.

10 Claims, 6 Drawing Figures

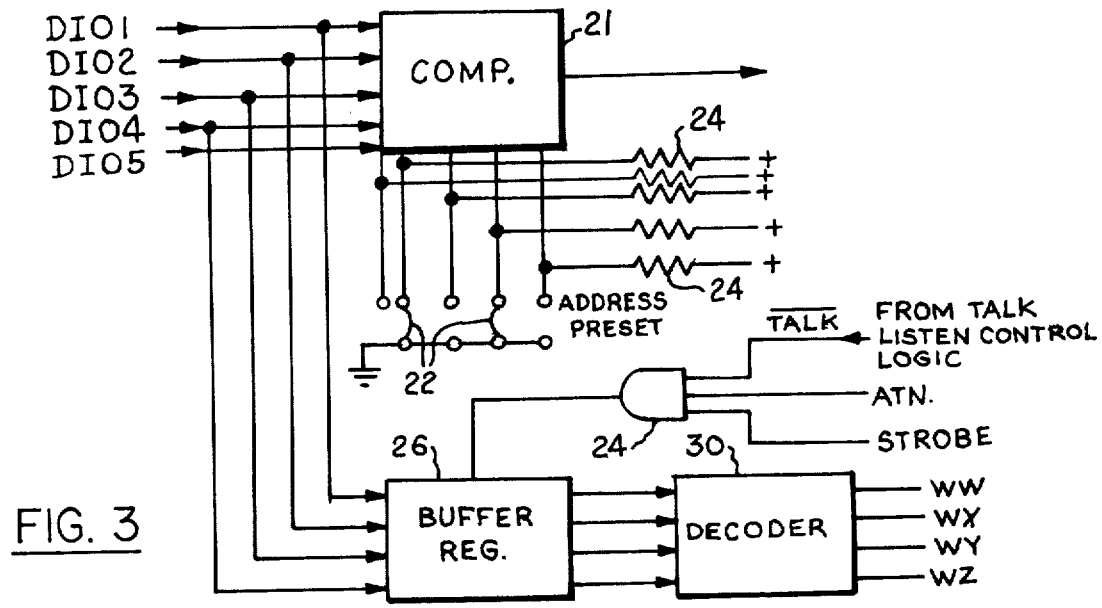

FIG. 3

DATA/ADDRESS FORMATS

```
                        BITS    1 2 3 4 5 6 7 8
        LISTEN INSTRUCTION      X X X X X 0 1 X
        EXPANDER ADR.
        TALK INSTRUCTION        X X X X X 1 0 X

W-PORT SELECTION INSTR. 0 1 1 1 T A/M X X   NOT USED
        X-PORT SELECTION INSTR. 1 0 1 1 T A/M X X
        Y-PORT SELECTION INSTR. 1 1 0 1 T A/M X X
        Z-PORT SELECTION INSTR. 1 1 1 0 T A/M X X   MANUAL CONTROL
                                                   INSTRUCTION BITS
                                                   BCD NUMERICAL CODE
    W,X,Y, OR Z PORT TALK DATA BYTES  X X X X 1 1 0 0  BCD NUMERICAL
    W,X,Y OR Z PORT TALK DATA BYTES   1 1 0 1 1 0 0 0  +SIGN
    W,X,Y OR Z PORT TALK DATA BYTES   1 0 1 1 0 1 0 0  -SIGN
    W,X,Y OR Z PORT TALK DATA BYTES   0 1 0 1 0 0 0 0  LINE FEED
```

FIG. 5

INTERFACE SYSTEM WHEREIN THE INTERFACE IS ADDRESSED BEFORE DATA TRANSFER FROM A SELECTED DEVICE

DESCRIPTION

The present invention relates to interface systems and particularly to a system for expanding the capabilities of an interface by permitting the connection of a plurality of additional data input ports, enabling the input data from the ports to be in various formats such as BCD or BCO (binary coded decimal or binary coded octal), and permitting manual activation for the transmission of data onto a bus via the interface.

The invention is especially suitable for providing a system for expanding the capabilities of a standard digital interface, particularly an interface complying with IEEE standard 488, which establishes the bus structure and the message coding formats and timing of messages which can be communicated among devices interconnected by the bus.

Reference may be had to a publication of the Institute of Electrical and Electronic Engineers, Inc. (IEEE) entitled "An American National Standard, IEEE Standard Digital Interface for Programmable Instrumentation" (1975) for a complete description of the IEEE standard 488 interface. This interface enables the interconnection over a common bus of many devices including a controller, instruments providing digital outputs, displays, printers and other input/output devices. The timing, active and inactive operative states and other interface functions as well as the message formats are dictated by the standard. It is desirable to expand the capabilities of a standard interface and particularly of the IEEE standard 488 interface. It is desirable that the bus be interconnected to devices which handle data in various formats other than the format which is dictated by the standard, for example, such as BCD and BCO as well as ASCII. It is also desirable to expand the number of input ports which can be interconnected to the bus, thereby allowing additional devices such as instruments with digital outputs, to be interconnected by the bus to a controller and still other devices which are connected to the bus by way of standard interfaces.

The standard interface does not allow for manual (human) interaction. The interface is programmed to operate automatically and to connect different devices in programmed sequence to the bus. A manual mode which allows for human intervention as well as for the automatic mode is desirable. It is desirable that the interface be capable of holding up the transmission of data until manually activated. Such a manual activation may be made with a foot pedal by an operator after a certain action is taken, for example, after a sample is loaded into a measuring device which is connected to a port of the interface.

Accordingly, it is an object of the present invention to provide an improved interface system for controlled communication between digital devices along a bus common thereto and which expands the capability of a standard interface while remaining compatible therewith.

It is a still further object of the present invention to provide an improved interface expansion system which is compatible with IEEE standard 488.

It is a further object of the present invention to provide an improved interface expansion system which expands the number of devices which can be interconnected and used without modification on a bus having a standard configuration and particularly a configuration in accordance with IEEE standard 488, such bus being referred to hereinafter as a 488 bus.

It is a still further object of the invention to provide an improved interface system which enables devices which transmit messages in various codes and formats to be interconnected via a standard bus and particles via the 488 bus.

It is a still further object of the present invention to provide an improved interface system which enables manual or automatic modes of transmission of messages via a standard bus and particularly the 488 bus.

Briefly described the invention provides a system for expanding the number of ports which can be interconnected to a bus and particularly to a 488 bus. The system includes means which are responsive to address messages transmitted along the bus and which identify the expanding system to enable listening to messages corresponding to different ones of the ports of the system. In listening to such messages, the expansion system has handshake logic control means which operates into the control lines of the bus. Compatibility is therefore maintained. Means responsive to the port identifying messages enable the sequential transmission of a predetermined number of bytes of data from the selected port to the bus with a handshake cycle between each byte to maintain compatibility with the standard. The byte transmitted from the ports may be in various formats, such as BCD or BCO and transmitted over the bus data lines in a format compatible with the standard. Manually activated control may be provided by means operated upon reception of a manual mode activating message or message portion. Then the transmission of the bytes from the ports is inhibited until manual activation, as by means of a switch such as a foot pedal switch.

The foregoing objects, features and advantages of the invention as well as a presently preferred embodiment thereof will become more apparent from a reading of the following description in connection with the accompanying drawings in which:

FIG. 3 is a more detailed block diagram showing portions of the data in/out control gating logic, address decode logic and the port address data buffer memory register and decoder of the system shown in FIG. 2;

FIG. 5 is a table of the data and address formats used in the system shown in FIG. 2.

Figure 1:
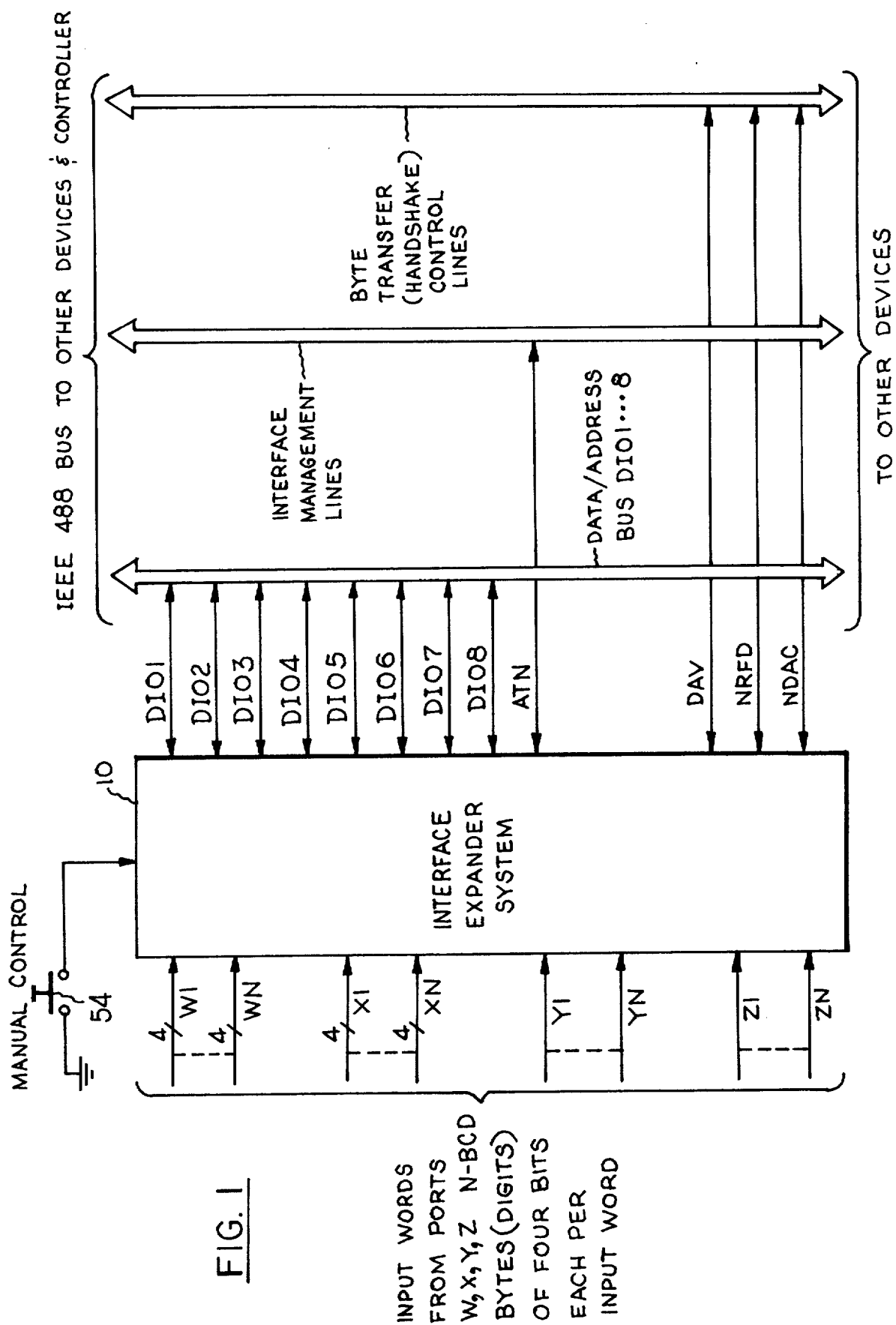
FIG. 1 is a block diagram illustrating how an interface system in accordance with the invention is interconnected to a 488 bus to which other devices and a controller are also connected.

Referring more particularly to FIG. 1 there is shown an IEEE 488 bus which consists of a data and address bus having 8 lines for data or address messages, DI01 through DI08. The bus also has interface management lines only one of which, the ATN or attention line, is used in connection with the interface expander system 10 provided in accordance with the invention. The byte transfer or handshake control lines, DAV or available, NRFD or not ready for data, and NDAC or not data accepted are connected to the expander system 10. The IEEE bus is interconnected with other devices and with a controller, such as a computer which provides the control messages and identifies which devices connected to the bus are to be operated as talkers and as listeners. The definition and identifications used herein are similar to the definitions and identifications in the publication describing the IEEE standard 488 which is referenced above.

The interface expander system permits the connection of four additional ports to the bus. These are ports W, X, Y and Z. The ports present N bytes in parallel to the expander system 10. These may be N BCD bytes or digits of 4 bits each. The N bytes constitute an input word. For port W, these words are W1 to WN. In a typical embodiment of the invention there may be 10 bytes per wod. N is then ten. Similarly, port X may have ten BCD bytes per input word and ports Y and Z also have ten BCD bytes as input words. Other formats, such as BCO, may be used. It will be noted that the data bus lines are capable of handling more than four bits. For most instrument systems, four bits is sufficient since they cover a numerical code (0-9). The other bits, of the eight available on the data lines, may be used for identification information. The four additional bits are used in this exemplary system to identify that the first four bits on the 488 bus represent BCD numerical information, sign information or a special character, for example, an ASCII line feed character which will identify the end of the transmission of a sequence of bytes from a selected port.

Figure 2:
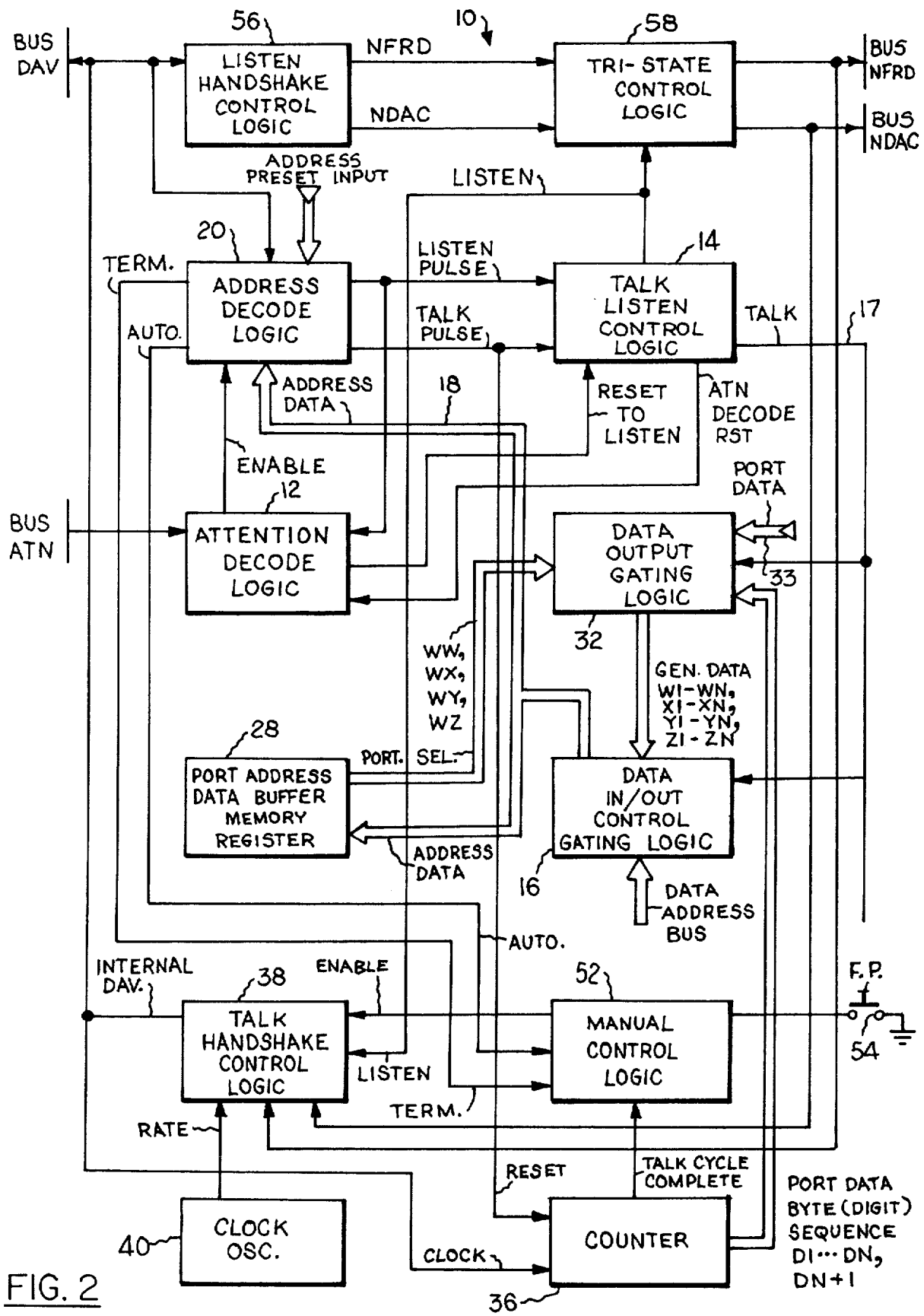
FIG. 2 is a detailed functional diagram of the interface expander system which is provided in accordance with a presently preferred embodiment of the invention.

Referring to FIG. 2 the interface expander 10 has attention decode logic 12 connected to the ATN line of the bus. Logic circuits, for example, using flip-flops, in the decode logic 12 detect the state and transitions in the ATN signal and reset talk-listen control logic 14 to the listen mode. The talk-listen control logic 14 contains flip-flops which hold the system in the listen mode until messages from the data address bus are received.

The data/address bus is the 8 line bus which carries the DI01 to DI08 bits. These lines are connected to the data in/out control gating logic 16. Address data is transferred via the gating logic 16 when the system 10 is conditioned to the listen mode. The talk line 17 from the talk-listen control logic identifies when the system 10 is in the listen mode and when it is in the talk mode. The address data from the data in/out control gating logic 16 is connected by address data lines 18 to address decode logic 20.

A portion of the address decode logic is shown in FIG. 3. A comparator 21 has connected to one set of input lines thereto, an address preset which may be obtained by connecting the terminals for the address preset to ground via jumpers 22 or allowing them to remain at a high level as provided from sources indicated by the plus sign which are connected to the terminals by way of resistors 24. The address preset uniquely identifies the expander system. When the lower order bits of the address data, DI01 to DI05 are applied to the decode logic 20, the comparator responds with an output level which enables the listen and talk pulses to the talk-listen control 14 to be generated. These pulses also require for their generation either the listen instruction or the talk instruction which are shown in FIG. 5. The first five bits of the instruction arrive by way of the DI01 to DI05 lines and are the address of the expander which is recognized by the comparator 21 (FIG. 3). The next two bits are the listen or talk instruction bits. Gating logic in the address decode logic 20 recognizes these bits and causes output pulses by gating the DAV pulse on either the listen pulse or talk pulse output line from the address decode logic 20.

The talk-listen control logic 14 is responsive to the listen and talk pulses and provides an output on the talk line 17 indicating that the system is in the talking or listening mode. When in the listening mode, as indicated by the not talk output from the talk-listen control logic 14 and the proper level on the bus ATN line, a strobe which is derived from the data byte transfer line, in proper time relationship with the DAV transition, is transmitted via a gate 24, which may be in the data input/output control 16, enables a buffer register 26 to receive the address data from the DI01 to DI05 lines 18 (see also FIG. 3). This buffer register 26 is in the port address data buffer memory register and decoder 28 (FIG. 2). The decoder 30 (see FIG. 3) outputs the port select signal WW, WX, WY and WZ.

Data output gating logic 32 receives the port select signals. These port select signals enable data bytes from one of the ports W, X, Y or Z which is selected in accordance with the port selection instruction data to be gated from the port data inputs 33 as generated data. The generated data will be the sequence of bytes W1 through WN, X1 through XN, Y1 through YN or Z1 through ZN.

The sequence in which the bytes of the selected port data are generated is determined by port data bytes or digits sequence control pulses D1 to DN and DN+1 from a counter 36. The counter operates during the talk cycle. It is reset by the talk pulse from the address decode logic 20. The system has talk handshake control logic 38 which functions to provide a 3-wire handshake as described in the above-referenced IEEE publication. The logic in the talk handshake control logic 38 generates an internal DAV pulse in response to the bus NFRD and NDAC pulses and may be designed in accordance with conventional 3-wire handshake techniques. The internal DAV pulse rate is established by a clock oscillator 40. The counter 36 is advanced in proper timed relationship with the 3-wire handshake and causes the bytes of data from the ports to be sequentially outputted via the data in/out control 16 to the address data bus lines of the 488 bus. The data in/out control gating logic 16 is shown in greater detail in FIG. 4.

Figure 4:
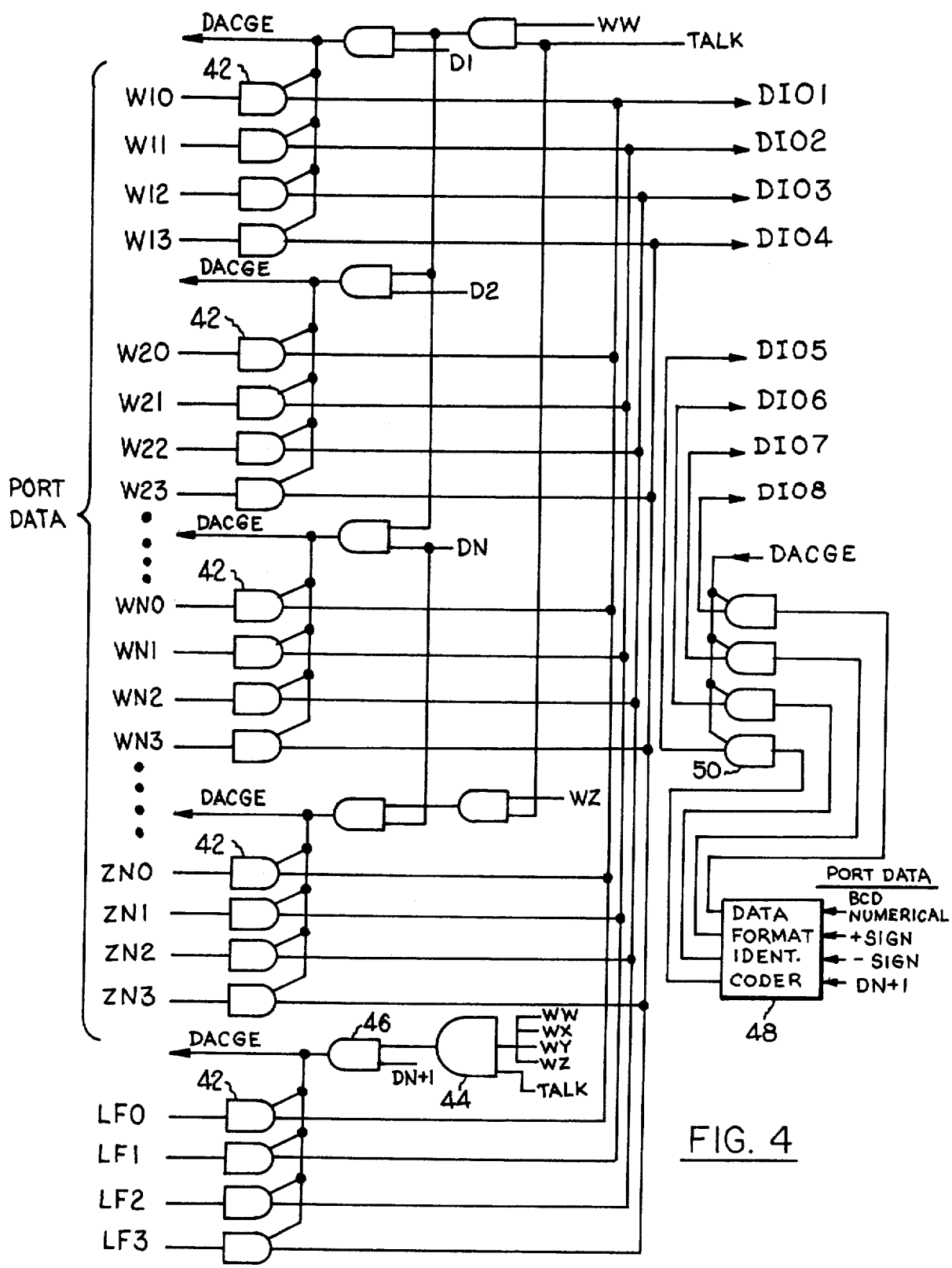
FIG. 4 is a more detailed block diagram showing the data output gating logic of the system illustrated in FIG. 2.

The capability of the system in providing expanded outputs from a plurality of ports is an important feature of the invention. FIG. 4 shows four sets of port data lines which are exemplary of the 4N sets of lines which may be used in this illustrated embodiment of the invention. In a typical system there are ten sets of lines for each of the four ports W, X, Y and Z. Each set of ports has four lines over which four bits of data which may represent numerical data in BCD code format are used. In FIG. 4 the first set of lines for port W are W10, W11, W12 and W13. This set of four lines carries the first BCD nibble of port data. The second BCD nibble of port data for the port W is on the input lines W20, W21, W22 and W23. The last nibble of data for port W is carried on the set of lines WN0, WN1, WN2 and WN3. Where ten nibbles of input port data are used there are ten sets of four lines each. FIG. 4 shows the last of all of the lines for the Z port data. These are the sets of lines ZN0, ZN1, ZN2 and ZN3.

Also in the data in/out control gating logic is a set of lines for generating the line feed nibble consisting of the bits LF0, LF1, LF2 and LF3.

Each port data nibble is gated through a set of four gates 42 which are tri-stated or placed in a high impedance output condition so as to isolate the ports from the data bus line, when an enabling level DACGE is not applied thereto. For the W port the enabling level is generated by the WW port select signal, the talk signal and the port data byte sequence pulses from the counter 36. These are the pulses D1 through DN. When WW, TALK and D1 occur, the first set of gates 42 is enabled and the nibble presented to the W10, W11, W12 and W13 lines is outputted to the data lines. The next counter sequence pulse D2 results in the W20, W21, W22 and W23 set of bits (the second W nibble) to be outputted on the data lines. The sequence proceeds through all of the N nibbles until occurrence of the DN+1 byte sequence pulse. Then the DACGE output is obtained from a gate 44 which receives the WW, WX, WY and WZ port select output, and another gate 46 which receives the output of the gate 44 and the DN+1 pulse. The line feed nibble is then outputted onto the data bus. This line feed character is used by the controller to indicate the end of a data transmission.

As shown in FIG. 5, the format of the W, X, Y or Z port data nibble contain a BCD numerical code in the lower order bits thereof and codes in the higher order bits (upper nibble) identifying the lower order bits as either BCD numerical, +, −, or line feed data. The identifying bits for the higher order data lines is obtained from a data format identification coder 48 which receives outputs representing whether the port data is BCD numerical or sign data. The coder also receives the DN+1 counter sequence pulse. Four bits are simultaneously outputted from the coder 48 through gates 50 from which the tri-state is removed upon occurrence of any DACGE level from the gate which generates that level. Then, simultaneously with the lower order bits (lower nibble), the higher order bits (upper nibble) representing the type of data are transmitted as a byte onto the data bus lines. The combination of the lower nibble and upper nibble will produce an ASCII character byte.

As shown in FIG. 5, with the port selection instruction messages, there is transmitted as the fifth and sixth bits on the DI05 and DI06 lines bits representing automatic or manual control modes as bit 6, and the terminate mode as bit 5. These bits are decoded in the address decode logic and provided as control levels to the manual control logic 52. The manual control logic also receives an input from the manual control 54 which is shown in FIGS. 1 and 2 as a push button switch. This switch may desirably be a foot pedal switch. Also one or more switches, parallelled together or with alternate actuating logic in the manual control logic 52, may be used. In the automatic mode, flip-flops in the manual control logic continuously provide an enable level to the talk handshake logic 32. The terminate control cooperates with a talk cycle complete pulse from the counter 36. This may be a DN+1 pulse or the pulse which occurs immediately after the DN+1 pulse before the counter 36 recycles. Upon occurrence of the talk cycle complete pulse from the counter with the terminate control active, the enable to the talk handshake control logic 38 is removed and the talk handshake control is inhibited from generating a DAV pulse. Since the DAV pulse must be transmitted in order for the bus to transmit the next passage or even to receive the next message, the entire system connected to the bus is maintained in a hold condition until the enable reappears. The enable is generated by the manual control logic 52 upon manual activation, when the operator presses on the switch 54. In this way, the expander provides a manual mode of operation whereby human intervention is possible and may override the program established by the controller and any interface connected to the bus. In a practical system, this feature will enable an operator to insure that all instrumentation is properly set and that all samples or probes are in position for proper data to be taken by the instrumentation. An alternate automatic mode is provided to respond with no human intervention.

The expander 10 also uses listen handshake control logic 56 and tri-state control logic 58. The listen handshake logic responds to the bus DAV pulse or the internally generated DAV pulse from the talk handshake logic 38 and generates NFRD and NDAC pulses. The tri-state control logic may be a transistor stage which is enabled by the listen output from the talk-listen control logic 14 and is otherwise in the open collector or high impedance state. The listen handshake control is implemented in accordance with conventional 3-wire handshake techniques to generate the NFRD and NDAC signals and applies them to the bus NFRD and NDAC lines.

Figure 6:
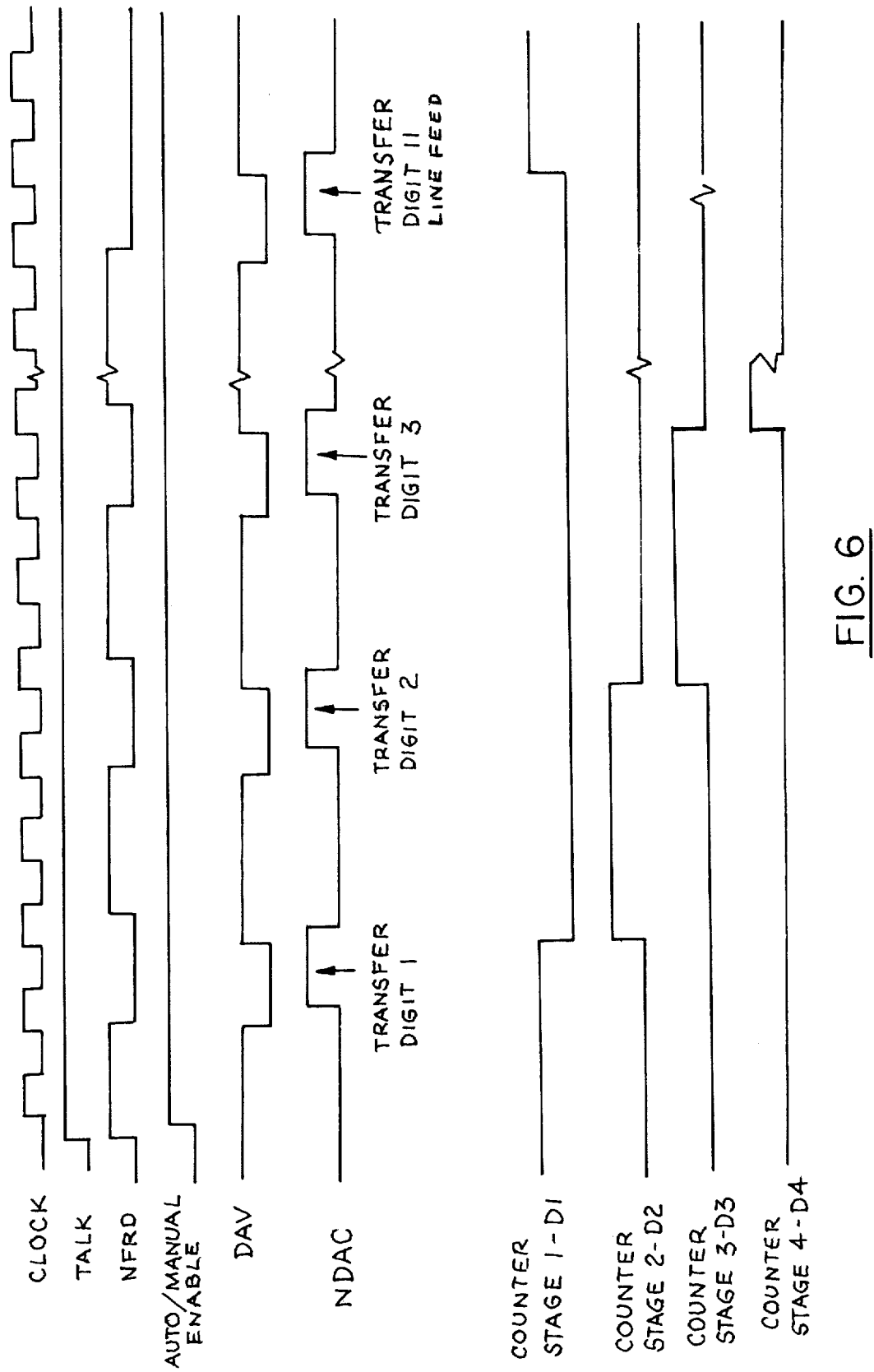
FIG. 6 is a timing diagram illustrating signals and outputs applied to or generated in the system shown in FIG. 2.

The operation of the system in transferring the port data during the talk mode will be more apparent from FIG. 6. The clock pulses from the oscillator control the internal timing of the expander system 10. Upon receipt of talk message during the listen mode, the talk output goes high and enables the talk handshake control 38 as well as the data output gating logic 32 and the data in/out control logic 16. It should be mentioned that the gates which generate the DACGE signal are part of the data output gating logic 32.

The talk handshake control logic 38 responds to the NFRD pulse and generates the DAV pulse. The DAV pulse is generated by the handshake control logic 38 and the data bytes are transferred on occurrence of the position going edge of the DAV pulses. The first counter stage produces the D1 pulse. When the counter is advanced the D2 pulse is produced. The counter is advanced and clocked upon occurrence of the trailing edge of the DAV pulse. Accordingly the D1, D2, D3 . . . DN, DN+1 pulses occur in proper timed sequence such that data bytes are dated out sequentially each upon occurrence of the trailing edge of the DAV pulse. Upon occurrence of the trailing edge of the NDAC pulse and the NFRD pulse from the bus lines, the handshake is completed and the next byte may be transmitted.

From the foregoing description it will be apparent that there has been provided an improved interface system which expands the capability of a standard interface, particularly the IEEE 488 interface. Variation and modification of the herein described system, such as the implementation thereof by different combinations of gates, flip-flops, and other combinatorial logic devices, will undoubtedly suggest themselves to those skilled in the arts. Accordingly, the foregoing description should be taken as illustrative and not in a limiting sense.

We claim:

1. A system for expanding the number of ports which can be interconnected to a bus which enables digital messages to be exchanged among devices connected to said ports and other devices and a controller connected to said bus, said expanding system comprising means responsive to address messages transmitted along said bus which identifies said expanding system for selectively enabling listening to messages corresponding to different ones of said ports of said expanding system, and means responsive to said port identifying messages for enabling the sequential transmission of a predetermined number of bytes of data to said bus from the one of said different ports which is selectively enabled.

2. The expanding system as set forth in claim 1 further comprising means responsive to messages transmitted along said bus for selectively enabling a listening mode and the reception of messages on said bus by said expanding system and a talking mode and the transmission of messages to said bus, and means for operating said sequential transmission enabling means when said expanding system is in said talking mode.

3. The expanding system as set forth in claim 2 further comprising means responsive to manual control for controlling said listening and talking mode selective enabling means for selectively enabling and inhibiting the conditioning of said expanding system into said talking mode.

4. The expanding system as set forth in claim 3 further comprising handshake control logic means for enabling said means for enabling the sequential transmission of said bytes of said data from said ports, and means operated by said means responsive to said manual control for selectively inhibiting and enabling said handshake control logic means.

5. The expanding system as set forth in claim 3 or 4 further comprising means responsive to control messages on said bus for conditioning said means responsive to manual control selectively to enable the transmission of said data from said ports only when said manual control is activated and automatically without activation of said manual control.

6. The expanding system as set forth in claim 3 or 4 further comprising means responsive to control messages on said bus for inhibiting the transmission of a second sequence of said data bytes after the termination of a first sequence of said data bytes without the activation of said manual control.

7. The expanding system as set forth in claim 4 wherein said bus is configured in accordance with IEEE standard 488.

8. The expanding system as set forth in claim 1 or 3 further comprising handshake control logic means for enabling said means for enabling the sequential transmission of said bytes of data from said ports and wherein said means responsive to address messages comprises address decode logic means for comparing said address message with a preset address which identifies that expanding system for conditioning said expanding system selectively into the talking and listening modes, said means responsive to said port identifying messages comprising means for storing said port identifying messages received from said bus while said system is in said listening mode, means for decoding said stored port identifying messages to provide an output identifying a selected one of said ports, and counter means operated by said handshake control logic means for providing a sequence of outputs each corresponding to a successive one of said data bytes, and means responsive to said port identifying output and said counteroutput for successively transmitting said data bytes from said selected port to said bus.

9. The expanding system as set forth in claim 8 further comprising means for providing a special byte, and means operated by the last of said counter outputs for transmitting said special byte after each sequence of data bytes.

10. The expanding system as set forth in claim 1 wherein said sequential transmission enabling means includes means for providing said bytes of data each comprising a plurality of bits and corresponding to numerical digits in ASCII code format.

* * * * *